United States Patent [19]

Marcus

[11] 3,846,486

[45] Nov. 5, 1974

[54] WATER-SOLUBLE TETRACYCLINES

[76] Inventor: Israel Marcus, Hemonylaan 17, Amsterdam, Netherlands

[22] Filed: June 10, 1970

[21] Appl. No.: 45,267

[30] Foreign Application Priority Data
June 12, 1969 Great Britain.................... 29968/69

[52] U.S. Cl............ 260/519, 260/559 AT, 424/227
[51] Int. Cl............................................. C07c 103/19
[58] Field of Search ......... 260/519, 521 R, 559 AT; 424/233

[56] References Cited
UNITED STATES PATENTS

| | | | |
|---|---|---|---|
| 2,880,234 | 3/1959 | Maxion.......................... | 260/559 AT |
| 2,972,630 | 2/1961 | Conover et al............... | 260/559 AT |
| 3,226,441 | 7/1961 | Miller........................... | 260/559 AT |
| 3,318,867 | 5/1967 | Jahnke ......................... | 260/559 AT |
| 3,397,231 | 8/1968 | Korst............................ | 260/559 AT |

*Primary Examiner*—Donald G. Daus
*Assistant Examiner*—Anne Marie T. Tighe
*Attorney, Agent, or Firm*—Holman & Stern

[57] ABSTRACT

Tetracycline or a tetracycline derivative such as oxytetracycline or chlortetracycline may be rendered water-soluble by complexing it with a methyleneamino-salicylate or methyleneamino-salicylic acid and then separating and purifying the complex so formed. The complexing step is generally carried out in an inert atmosphere, in the absence of light and in the presence of methyl alcohol as solvent.

10 Claims, No Drawings

WATER-SOLUBLE TETRACYCLINES

The present invention relates to a method of preparing and purifying a water-soluble complex of tetracycline or of a tetracycline derivative. The invention also relates to the purified tetracycline complex so prepared.

For convenience sake, we refer throughout this specification to tetracycline, although the invention is, of course, applicable to tetracycline derivatives such as oxytetracycline, chlortetracycline etc. as well as tetracycline itself, and it will be understood that, whenever reference is made to tetracycline in the specification, the derivatives of tetracycline are also, by implication, referred to.

Tetracycline itself is almost insoluble in water and, consequently, when it is administered to a patient, not only is it not properly dispersed throughout the patient's system, but it may also cause local disorders, e.g. malfunction of the intestines and the renal system and destruction or damage to other sensitive tissues. Consequently, a number of attempts have been made to produce a tetracycline derivative which is not only water-soluble, but which also retains the activity or a major portion of the activity of tetracycline.

These attempts have not met with unqualified success. Although it is now possible to manufacture a water-soluble derivative of tetracycline, the compounds prepared suffer from a number of disadvantages, e.g. a solubility which is less than is desired and which, consequently, leads to some of the disadvantages of tetracycline itself, an increased toxicity, an activity lower than, indeed in many cases substantially lower than, that of tetracycline, expense of manufacture etc. An example of the prior art attempts at manufacturing water-soluble tetracycline derivatives is that material sold under the Trade Name "Reverin" by Hoecht Belgium S.A.: although this has met with great success, its toxicity is rather higher than is desirable for some cases. Reverin is a single chemical compound containing the basic tetracycline structure with a number of water-solubilizing substituents at various points in the tetracycline structure.

It is, accordingly, an object of the present invention to provide a water-soluble tetracycline complex which is highly soluble, has a very low toxicity and is extremely cheap to manufacture.

A further object of the invention is to provide a method of preparing and purifying said complex. Other objects and advantages will become apparent as the description proceeds.

I have surprisingly discovered that a certain class of compounds will form addition complexes with biologically active aromatic amines to produce water-soluble compositions which retain all the original activity of the aromatic amines, which have extremely low toxicities and which are cheap to manufacture. This class of compounds comprises methyleneamine salicylates and methyleneamino salicylic acid.

Broadly, I have found that these water-soluble complexes may be prepared by reacting together a tetracycline or tetracycline derivative and a methyleneamino salicylate or methyleneamino salicylic acid and subsequently separating and purifying the product. The procedure I prefer to use is as follows:

Tetracycline and the methyleneamino salicylate or methyleneamino salicylic acid are dissolved in methanol, either in one step to form immediately a single solution, or by dissolving the two reactant components in two separate quantities of methanol to form two separate solutions which are then mixed. The reaction is carried out in an inert atmosphere, such as nitrogen, and preferably in the absence of light. A suitable common solvent is methyl alcohol. The tetracycline-methyleneamino-salicylate complex separates immediately. The deposit is then filtered off, washed with methanol, and is dried, suitably in a vacuum. The dried product will be without water of crystallization and, in order to regain this, it may be left in the air for a suitable period of time.

The inert atmosphere may comprise any inert gas, such as nitrogen or the noble gases, such as helium, neon, argon, etc. However, in view of the comparative expense of the noble gases, I prefer to use nitrogen. Although, if the reaction is effected in the presence of oxygen, a precipitate is obtained, this lacks many of the desirable properties of the product obtained by reaction in an inert atmosphere, in particular the product undergoes extremely rapid deterioration, both when isolated and when in solution.

I have also surprisingly found that methanol is the only solvent, of the many experimented with, which is effective to produce the target product. The nature of the solvent used, both for carrying out the reaction and for washing the product complex, has a highly critical effect on the nature of the product obtained. Important criteria are: solubility of starting materials, physical form of the end product and solubility characteristics of the latter. Only methanol optimizes all these factors, especially as the wash liquid.

Since the complex is somewhat light-sensitive, the reaction is preferably carried out in the absence of light.

The complex may be administered in association with any pharmaceutically acceptable diluent or excipient and may be supplied to the patient in any conventional form and by any conventional route, e.g. the parenteral route, the oral route, or the anal route. The complex may be formulated as, e.g. an injectible solution in a suitable solvent, especially a solvent comprising water, or with a solid carrier in tablet form, or as a suppository. In general, tetracycline and its derivatives are administered in tablet form in association with a suitable solid carrier.

The addition complexes of the present invention have been found not to be stable chemical compounds. This may be shown by, inter alia, the fact that they react very easily and, especially, can undergo interchange reactions with other aromatic amines. A solution of the addition complex of tetracycline or a derivative thereof with methylene-amino salicylate will react with, for example, streptomycin, dihydrostreptomycin or neomycin, to cause a rearrangement, a complex being formed between the methyleneamino-salicylate and the streptomycin, dihydrostreptomycin or neomycinm and the tetracycline or its derivative being liberated. I therefore believe that the novel complex of this invention is a loosely bound addition complex, the salicylate and the tetracycline being held together by "weak" bonds.

The invention is further illustrated with reference to the following Examples which are, of course, merely given by way of exemplification and are not to be taken in any limiting sense.

EXAMPLE 1

Preparation of a tetracycline-sodium methyleneamino-salicylate complex.

One gram of amphoteric tetracycline, protected from the light, was dissolved, with stirring and with the introduction of nitrogen, in 10 ml of methyl alcohol. A second solution was prepared by dissolving 0.5 g of sodium methyleneamino-salicylate in 2 cc of methyl alcohol (approximately equivalent quantities). The two solutions were mixed. The tetracycline-sodium methyleneamino-salicylate separated immediately. It may be generally represented by the following formula:

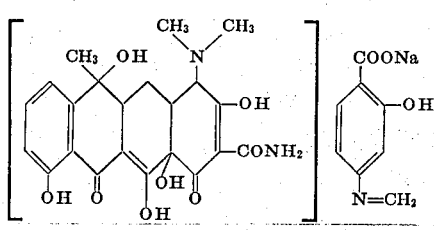

The deposit was filtered off, washed three times with methanol and dried in a vacuum.

The dry product was allowed to stand for twelve hours in air, in order to regain its water of crystallization. The compound was a bright yellow colour, soluble in water and in a physiological saline solution. Its stability was found to be dependent upon the concentration of the tetracycline-sodium methyleneamino-salicylate in the solution. A highly concentrated solution is stable for 6 – 8 hours. Increasing the content of methyleneamino-salicylate increases the stability.

5 Grams of this tetracycline-methyleneamino-salicylate complex was dissolved in 100 ml. of a mixture containing 50 percent water and 50 percent ethanol, with stirring and slight heating. A solution of 9.6 g of dihydrostreptomycin in ethanol was added. A deposit formed which was filtered off. It is believed that there was formed an unstable addition compound of dihydrostreptomycin with the methyleneamino-salicylate.

EXAMPLE 2

Preparation of an oxytetracycline-sodium methyleneamino-salicylate complex.

1 Gram of amphoteric oxytetracycline, protected from the light, was dissolved, with stirring and with the introduction of nitrogen, in 10 ml. of methyl alcohol. A second solution was prepared by dissolving 0.5 g of sodium methyleneamino-salicylate in 2 cc of methyl alcohol (approximately equivalent quantities). The two solutions were mixed. The oxytetracycline-sodium methyleneamino-salicylate separated immediately. It may be generally represented by the following formula:

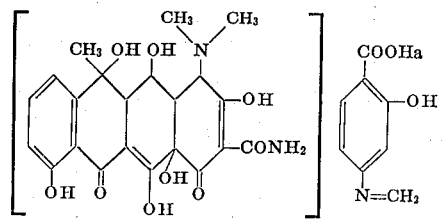

The deposit was filtered off, washed three times with methanol and dried in a vacuum.

The dry product was allowed to stand for about twelve hours in air, in order to regain its water of crystallization. The compound had a bright yellow colour, was soluble in water and in a physiological saline solution. Its stability was found to be dependent upon the concentration of complex in the solution. A highly concentrated solution was stable for several hours.

COMPARATIVE TESTS

The two compositions tested were tetracycline-sodium methylene-amino salicylate prepared as in Example 1 and Reverin. The test animals were albino mice weighing between 17.5 and 22 g. The compositions were injected by the intraperitonial route.

The toxicity was determined for six mice per dose. The compounds were administered as solutions in distilled water. The results are as follows:

Table I

Toxicity of Reverin

| Dose | 1 hour | Number of deaths after 12 hours | 24 hours | 48 hours |
|---|---|---|---|---|
| 275 mg/kg | 6 | 0 | 0 | 0 |
| 250 mg/kg | 4 | 0 | 0 | 0 |
| 225 mg/kg | 4 | 0 | 0 | 0 |
| 200 mg/kg | 1 | 0 | 0 | 0 |
| 175 mg/kg | 0 | 0 | 0 | 0 |
| 150 mg/kg | 0 | 0 | 0 | 0 |

Table II

Toxicity of Tetracycline-sodium methyleneamino-salicylate

| Dose in mg/kg | 1 hr. | 16 hrs. | 24 hrs. | 48 hrs. | 72 hrs. | 96 hrs. | 120 hrs. | 144 hrs. | Total deaths |
|---|---|---|---|---|---|---|---|---|---|
| 700 | 0 | 0 | 6 | — | — | — | — | — | 6 |
| 650 | 0 | 0 | 6 | — | — | — | — | — | 6 |
| 600 | 0 | 0 | 5 | 0 | 0 | 0 | 0 | — | 5 |
| 550 | 0 | 0 | 3 | 1 | 0 | 0 | 0 | 0 | 4 |
| 500 | 0 | 0 | 3 | 2 | 0 | 0 | 0 | 0 | 5 |
| 475 | 0 | 0 | 5 | 1 | — | — | — | — | 6 |
| 450 | 0 | 0 | 4 | 1 | 0 | 0 | 0 | 0 | 5 |
| 425 | 0 | 0 | 3 | 0 | 0 | 1 | 0 | 0 | 4 |
| 400 | 0 | 3 | 0 | 0 | 0 | 0 | 0 | 0 | 3 |
| 375 | 0 | 0 | 3 | — | — | — | — | — | 6 |
| 350 | 0 | 3 | 2 | 0 | 0 | 0 | 0 | 0 | 5 |
| 325 | 0 | 0 | 0 | 0 | 0 | 0 | 0 | 0 | 0 |
| 300 | 0 | 1 | 0 | 0 | 0 | 0 | 0 | 1 | 2 |
| 275 | 0 | 0 | 0 | 0 | 0 | 0 | 0 | 0 | 0 |
| 250 | 0 | 1 | 0 | 0 | 0 | 0 | 0 | 0 | 1 |
| 225 | 0 | 0 | 0 | 0 | 0 | 0 | 0 | 0 | 0 |

From these figures, it was found that the LD50 of Reverin was 225 mg/kg and the LD50 of tetracycline-sodium methyleneamino-salicylate was 375 mg/kg. Thus, the tetracycline-sodium methyleneamino-salicylate complex is significantly less toxic than Reverin. Moreover, the toxicity of the tetracycline-sodium methyleneamino salicylate complex manifests itself much more slowly than that of Reverin. At lethal doses, Reverin was found to kill the mice within less than one hour after injection. The toxicity of the tetracycline-sodium methyleneamino-salicylate complex did not begin to produce this result until the day after the day of administration and some times the deaths were delayed until the second or third days and even as long as the fifth day.

I claim:

1. In a method of manufacturing a water-soluble tetracycline complex, which comprises the steps of: reacting a first component selected from the group consisting of tetracycline, chlortetracycline and oxytetracycline with a salicylate component selected from the group consisting of methyleneamino-salicylates and methyleneamino-salicylic acid, in methanol to thereby form a precipitate of said complex; filtering said precipitate to remove same from said methanol; washing said complex with methanol, and drying said complex, the improvement comprising performing said reaction in an inert atmosphere.

2. A method as claimed in claim 1, wherein said inert atmosphere is nitrogen.

3. A method as claimed in claim 1, effected in the absence of light.

4. A method as claimed in claim 1, wherein said complex is dried in a vacuum.

5. A method as claimed in claim 1, wherein said dried complex is subsequently allowed to stand in air, thereby absorbing water of crystallization.

6. A method as claimed in claim 1, wherein said salicylate component is sodium methyleneamino-salicylate.

7. A method as claimed in claim 1, wherein said complex is tetracycline-sodium methyleneamino salicylate complex.

8. A method as claimed in claim 1, wherein said first component is tetracycline.

9. A method as claimed in claim 1, wherein said first component is oxytetracycline.

10. A method as claimed in claim 1, wherein said first component is chlortetracycline.

* * * * *